United States Patent [19]

Biscomb

[11] 4,309,006
[45] Jan. 5, 1982

[54] TETHERED AIRFOIL WIND ENERGY CONVERSION SYSTEM

[76] Inventor: Lloyd I. Biscomb, 4452 Burlington Pl., NW., Washington, D.C. 20016

[21] Appl. No.: 44,934

[22] Filed: Jun. 4, 1979

[51] Int. Cl.³ .................. B64B 1/02; B64B 1/50; F03D 9/00
[52] U.S. Cl. .................. 244/33; 244/153 R; 290/55; 415/2 A; 415/7; 416/85
[58] Field of Search ............ 290/43, 44, 54, 55; 415/2, 3, 7; 416/85, 86, 9, 93, 189; 244/30, 33, 153 R, 58

[56] References Cited

U.S. PATENT DOCUMENTS

| | | | |
|---|---|---|---|
| 911,260 | 2/1909 | Pennock | 415/7 X |
| 3,924,827 | 12/1975 | Lois | 244/153 R |
| 3,987,987 | 10/1976 | Payne et al. | 416/9 X |
| 4,021,135 | 5/1977 | Pedersen et al. | 290/55 |
| 4,070,131 | 1/1978 | Yen | 290/44 |
| 4,073,516 | 2/1978 | Kling | 244/33 |
| 4,116,581 | 9/1978 | Bolie | 290/55 |
| 4,166,596 | 9/1979 | Mouton, Jr. | 290/44 |

FOREIGN PATENT DOCUMENTS

| | | | |
|---|---|---|---|
| 830628 | 1/1952 | Fed. Rep. of Germany | 244/33 |
| 2720339 | 12/1978 | Fed. Rep. of Germany | 416/85 |
| 518068 | 2/1940 | United Kingdom | 244/33 |

*Primary Examiner*—Charles E. Frankfort
*Attorney, Agent, or Firm*—Larry S. Nixon

[57] ABSTRACT

A generally toric lighter-than-air gas bag-type airfoil is tethered to the ground at a plurality of angularly widely distributed points about the periphery of the gas bag. A wind turbine is mounted at the entrance to the axially central vent. The tether lines are entrained about individually operable power winches, preferably controlled by a microprocessor which takes in wind direction and tether line tension data and operates the winches and inflation gas inlet and outlet valves to orient the wind turbine into the wind for maximum power output.

33 Claims, 6 Drawing Figures

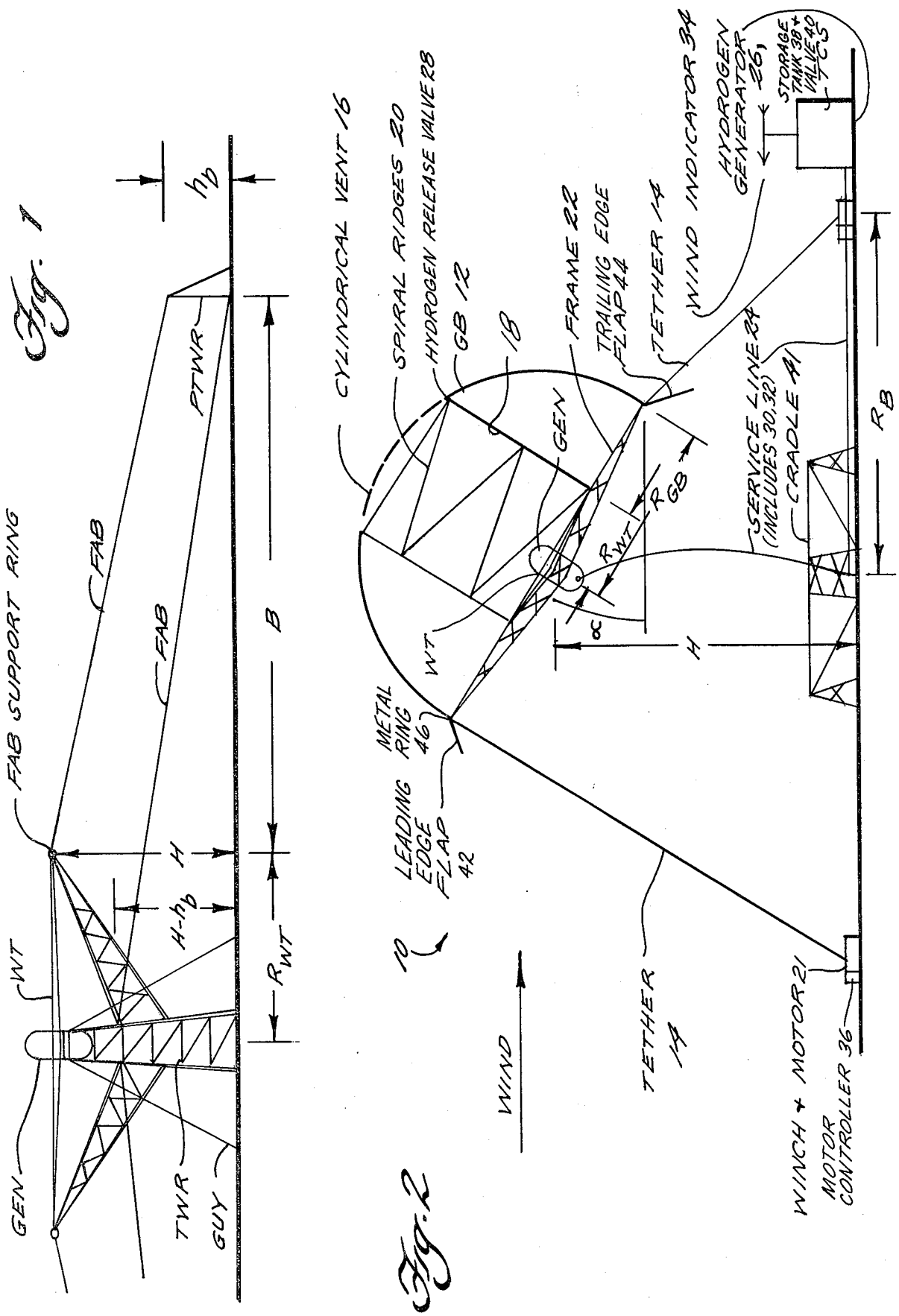

TETHERED AIRFOIL WIND ENERGY CONVERSION SYSTEM

BACKGROUND OF THE INVENTION

There is shown schematically in FIG. 1 an elevational view of a first-generation tethered airfoil wind energy conversion system, which was designed by the present inventor and which is included here for illustrative purposes. Referring to that FIGURE, the following derivation is made.

Consider the tethered airfoil wind energy conversion system (hereinater "TAWECS") of FIG. 1 to be a large circular airfoil of planform surface area S, and wind passing over it produces lift L. The portion of L that is effective in reducing the air pressure over the TAWECS vent (in which is mounted a conventional wind turbine and electric generator) should be $(A_v/S)L$, where $A_v$ is the area of the vent. Then the RMS decrease in air pressure over the TAWECS vent caused by the wind, $$\Delta p = (A_v/S)L \div A_v = L/S \quad (\text{lb/ft}^2)$$

The RMS head due to wind input to the TAWECS, $$h = \Delta p/\rho = L/S\rho \quad (\text{ft})$$

where $\rho$ is the air density (0.0023 slug/ft$^3$). From O. W. Eshbach, "Handbook of Engineering Fundamentals", 2nd Ed., Wiley, 1952, p. 7-75 to 7-77, $$C_L = L/(\tfrac{1}{2}\rho V_w^2 S) = (3/20)a$$

where $C_L$ = coefficient of lift
$V_w$ = RMS velocity of wind over the airfoil surface (ft/sec)

$a$ = maximum camber of airfoil in % of chord

= (camber/chord) 100

= $\tfrac{2}{3}$ of design $C_L$ in tenths = $\tfrac{2}{3}$ $C_L$ × 10

Then
$$L = 3/40 \, a\rho \overline{V}_w^2 S \quad (\text{lb})$$

$$h = 3/40 \, a \, \rho \overline{V}_w^2 = \overline{\Delta p}/\rho \quad (\text{ft})$$

The above derivation, which will be useful in the detailed description to follow, does not provide for the local variations in pressure over the airfoil surface. Instead, these calculations were for gross, first order feasibility estimates, using overall or average airfoil properties, and RMS values for the time-varying parameters. (A more detailed analysis using partial differential equations would be required to predict local pressure variations.)

In literature searching prior to the preparation of this document, the present inventor has become aware of the following prior art:

Prior U.S. Patents

| Patentee | Pat. No. | Issue Date |
| --- | --- | --- |
| Bolie | 4,017,205 | April 12, 1977 |
| Carson, et al | 4,018,543 | April 19, 1977 |

-continued

| Patentee | Pat. No. | Issue Date |
| --- | --- | --- |
| Bolie | 4,116,581 | Sept. 26, 1978 |

Bolie, in U.S. Pat. No. 4,116,581, has described a wind turbine (hereinafter "WT") employing airfoil principles to enhance the pressure drop across the WT, i.e., reduced pressure on the suction side. The Bolie structure employs a fixed hemispherical shell containing the WT in the lower half of the structure, and a rotating hemispherical shell in the upper half, with a vent oriented into the wind, and curved deflectors to direct the wind into the WT. The Bolie structure is rigid, implying size limitation, dictated by strength of materials considerations, on WT radii of probably 50 feet or less. Since the Bolie structure is approximately a sphere, with two opposing suction sides and camber of approximately 0, the reduced pressures on the top and bottom hemispheres should approximately cancel each other, leaving only the wind flowing through the aperture being effective in driving the WT, thus providing no aerodynamic advantage over a conventional horizontal axis WT, and a considerable economic disadvantage.

In both of the Bolie patents, the angle of attack of the airfoil $\alpha = 0$; an angle of attack $\alpha > 0$ is impractical with the Bolie embodiments. Further, the Bolie structure in U.S. Pat. No. 4,116,581 must rotate into the wind, implying mechanical wear problems.

SUMMARY OF THE INVENTION

The present invention provides a tethered airfoil wind energy conversion system which holds promise for being more efficient than those of the prior art. In particular, the device of the invention preferably has an optimum angle of attack $\alpha$ of up to at least 30° in the preferred embodiment, which increases the coefficient of lift by a factor of at least 6-8 with respect to an airfoil with $\alpha = 0$. See Eshbach, supra, p. 7-78. Further, the device of the invention preferably is deployed into the wind without a requirement for being rotated and does not have the size limitation implied in prior art structures.

Other distinctions and advantages will become apparent in the following description.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 1 is a diagrammatic elevational view of a first generation TAWECS device, discussed in the "Background" section hereinabove;

FIG. 2 is a diagrammatic elevational view of a first embodiment of the TAWECS device of the present invention;

DETAILED DESCRIPTION

Figure 3:
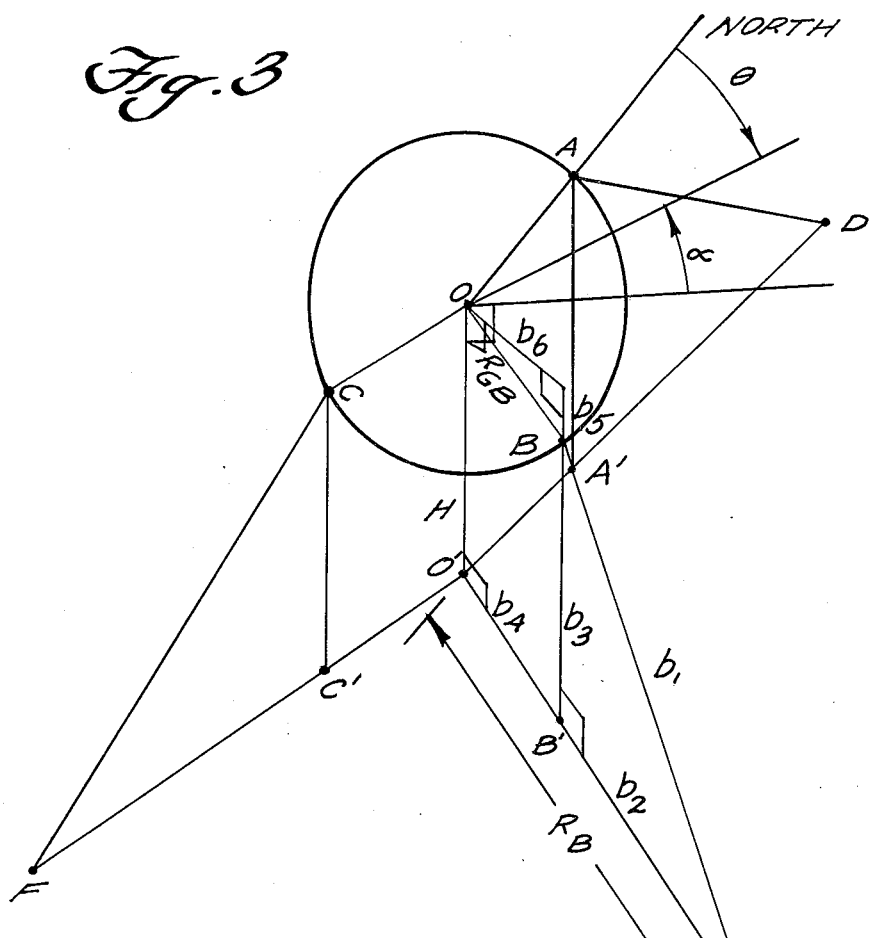
FIG. 3 is a perspective projection showing the geometry of a tether control system therefor.

A first embodiment of a tethered airfoil wind energy conversion system, TAWECS, is shown in FIG. 2 at 10. In this embodiment, a gas bag airfoil 12 of approximately hemispherical shape is filled with enough lighter-than-air gas, e.g., hydrogen to lift the TAWECS components and provide a moderate tension on the three tethers 14. The WT is mounted in the bottom center of the gas bag 12, with a cylindrical vent 16 above the WT.

In a typical such TAWECS configuration, by requiring that the radius of the gas bag ($R_{GB}$) be at least three times the radius of the wind turbine ($R_{WT}$), the cylindrical vent may be tall enough to produce and sustain a confined vortex by lining the interior sidewall 18 of the cylindrical vent with spiral ridges 20 to impart an angular acceleration to the air flowing vertically in the cylindrical vent, as in the vortex generator (VG) described by Yen in U.S. Pat. No. 4,070,131. The vortex thus produced further reduces the pressure above the WT in addition to the pressure reduction caused by the suction side of the hemispherical airfoil shape of the gas bag.

The gas bag, being flexible, should prevent ice and snow buildup, by being free to deflect in six modes: roll, pitch, yaw, heave, sway, and surge. Since gas bags may be of almost arbitrary size, it is likely that the size limitation is determined by the WT vanes, and 150-foot vanes are now under development by others. A hemispherical airfoil produces maximum camber/chord ratio, maximizing pressure drop across the WT, and thus maximizes power produced.

The hemispherical hydrogen-supported gas bag is tethered by three or more lines 14 (shown in the elevation view of FIG. 2 as if there were four), which are adjusted by winches driven by motors 21 controlled by a tether control system (TCS) to control the tilt of the gas bag 12 into the wind, such that the angle of attack $\alpha$ is optimum to maximize the pressure drop across the WT. Each tether 14 ends at the outer end of the frame 22 that supports the WT and the generator (GEN) driven by the WT. The gas bag is attached to this frame to lift the TAWECS components. In addition to those components already mentioned, a service line 24 is provided from the bottom of the GEN to the ground, and along the ground a distance greater than $R_{GB}$, to provide hydrogen replenishment from a hydrogen generator 26 on the ground, power for aircraft warning lights, if required, control signals for a hydrogen release valve 28 in the top of the gas bag, control signals for pitch control of the WT vanes, lightning ground cable 32 30 and a power output cable. Service line 24 may be led along one of the tether lines 14, instead of vertically to the ground as shown in FIG. 2. This will enable placing two or more TAWECS one above the other at particularly desirable (windy) sites. The power output cable of service line 24 may be replaced with a microwave transmitter in the TAWECS and a microwave receiver on the ground. A wind direction indicator 34 is required on the ground to supply a wind direction-representing signal to the TCS, which calculates the required lengths of the three tethers 14 to tilt the TAWECS into the wind at its optimum angle of attack $\alpha$ to maximize power output. Control signals are then sent to the three tether winch motor controllers 36 to set the three tether lengths in accordance with these calculations. In effect, as each tether line is shortened, e.g. by reeling in on the respective winch, the two ends of that tether line are brought closer to one another. Since the tether line extends between its end aloft with the airfoil and its ground-anchored end, the act of effectively shortening it pulls downwards on the corresponding side of the aloft airfoil, thus correspondingly tilting the airfoil.

To obtain the equations that must be solved in real time by the TCS to control the three tether winches 21, consider FIG. 3, in which the circle at elevation H above the ground at its center represents the bottom of the gas bag 12. Let $$\angle AOC = \angle COB = \angle AOB = 2\pi/3$$

$$OA = OB = OC = R_{GB}, \text{ the three frame arms}$$

$$O'D = O'E = O'F = R_B \text{ in the ground plane}$$

Then $$a_1 = (a_2^2 + a_3^2)^{\frac{1}{2}} = (a_2^2 + (H - a_5)^2)^{\frac{1}{2}}$$

$$b_1 = (b_2^2 + b_3^2)^{\frac{1}{2}} = (b_2^2 + (H - b_5)^2)^{\frac{1}{2}}$$

$$c_1 = (c_2^2 + c_3^2)^{\frac{1}{2}} = (c_2^2 + (H - c_5)^2 L^{\frac{1}{2}}$$

where $$a_2 = R_B - a_4 = R_B - a_6 = R_B - (R_{BG}^2 - a_5^2)^{\frac{1}{2}}$$

$$b_2 = R_B - b_4 = R_B - b_6 = R_B - (R_{GB}^2 - b_5^2)^{\frac{1}{2}}$$

$$c_2 = R_B - c_4 = R_B - c_6 = R_B - (R_{GB}^2 - c_5^2)^{\frac{1}{2}}$$

and for $\theta = 0$ to $2\pi/3$, $$a_5 = R_{GB} \sin \alpha \cos 3\theta/2$$

$$b_5 = -R_{GB} \sin \alpha \cos 3\theta/2$$

$$c_5 = -R_{GB} \sin \alpha$$

for $\theta = 2\pi/3$ to $4\pi/3$, $$a_5 = -R_{GB} \sin \alpha$$

$$b_5 = -R_{GB} \sin \alpha \cos 3\theta/2$$

$$c_5 = R_{GB} \sin \alpha \cos 3\theta/2$$

for $\theta = 4\pi/3$ to $2\pi$, $$a_5 = -R_{GB} \sin \alpha \cos 3\theta/2$$

$$b_5 = -R_{GB} \sin \alpha$$

$$c_5 = R_{GB} \sin \alpha \cos 3\theta/2$$

These equations are readily solvable by many commercially available, inexpensive microprocessors, for given values of $R_B$, $R_{GB}$, H, and $\alpha$, with $\theta$ obtained from the wind direction indicator 34.

The hydrogen generator 26 may be one of several known types, which produce hydrogen by electrolysis of water (possibly obtained from condensed water vapor in the air), or by the process described by Pangborn, et al in U.S. Pat. No. 4,075,313, or by other means. (The Pangborn process for generating hydrogen requires use of at least one of several high temperature subprocesses, one of which is preferably carried out at 750° C.–950° C. For those subprocesses requiring temperatures exceeding that obtainable from a rotary mechanical heat generator, either a double convex lens may be used when the sun is available (or some other means of concentrating the sun's rays), or some of the hydrogen generated may be burned to produce the required temperature. Electric heating could be used in the Pangborn process for hydrogen production, and probably would be preferable, connected to the WT-driven electric generator (either resistance, arc, or induction heating). In fact, electric heating may be preferable for all the subprocesses requiring heat, to avoid burning any of the hydrogen produced by the hydrogen generator.)

The hydrogen generator 26 must have a storage tank 38 and reserve capacity enough for a heavy snow or ice load accumulating during a period of no wind, to provide the extra lift required to keep the gas bag aloft with moderate tension on the tethers. The hydrogen generator may supply hydrogen not only to the airfoil, but elsewhere as an end product of the TAWECS. The hydrogen generator may be borne aloft by the airfoil. The TCS must sense tension on the tethers, and open the hydrogen supply valve 40 when tension becomes too low. The TCS must also sense excessive tension on the tethers, and open a release valve 28 in the top of the gas bag to release excess hydrogen to lower the tension on the tethers. The TCS must also provide for manual control of the tether winch motors for use in lowering the TAWECS for maintenance, which would require sufficient control to settle the GEN and frame gently into a special cradle 41.

Leading and trailing edge flaps 42, 44, which increase the camber, coefficient of lift, and optimum angle of attack of an airfoil, can be added to the hemispheric gas bag airfoil by adding a metal ring 46 around the base of the gas bag of sufficient strength to support the flaps, and attached to the frame 22 that supports the WT and GEN and connects to the tethers 14. Such a metal ring may be desirable for another reason-to provide tie points for hold-down lines (not shown) or a net (not shown) over the gas bag.

In lieu of an electric generator GEN, the WT may drive a flexible shaft (not shown) connected to a mechanical load (not shown) on the ground.

The equation set forth hereabove in regard to the simplified system shown in FIG. 1, relating pressure across the WT, airfoil geometry, and wind velocity, may be rewritten $$\overline{\Delta p / V_w^2} = 0.075 \, a \, \rho$$

and compared with test data for an airfoil approximating a hemisphere, to confirm the derivation. In "Aerofoil Sections", F. W. Riegels, Butterworth, London, 1961, the airfoil with a section closest to that of a hemisphere is the Gö 625, tested at Göttingen in 1941, for which a $= 10$, pressure coefficient $C_p = -1.6$ on the suction side and 0 on the pressure side at 20% of chord (length from leading edge) for a design coefficient of lift $C_L^*$ of 0.075, and $\alpha = 14°$ for $C_L$ max of 1.5. From Riegels, p. 275, $C_p = \Delta p/q = \Delta p/(\frac{1}{2}\rho V_w^2)$ $\Delta p/V_w^2 = \frac{1}{2}\rho C_p$ Comparing the derivation with regard to FIG. 1 for $\Delta p/V_w^2$ with test data for this airfoil, $$0.075 \, a\rho = \frac{1}{2}\rho C_p$$

$$0.15 \, a = C_p.$$

$1.5 \approx 1.6$ and the derivation is approximately confirmed. In "Handbook of Airfoil Sections for Light Aircraft", by M. S. Rice, Aviation Publications, Milwaukee, 1971, p. 73 shows the test data for a USA-35A airfoil, with a section closest to that of a hemisphere. No test date is given, but most of the 125 airfoils in the handbook were tested between 1918 and 1937. The USA-35A airfoil has a value of a of 9.35 at 30% of chord, with $\alpha = 20°$ for maximum value of $C_L$. No data on $C_p$ are given in Rice. From the data for these two airfoils, a hemispherical airfoil with a cylindrical central vent, and $R_{GB} = 3R_{WT}$, should have a value of a of about 20 at 50% of chord, and an $\alpha$ of about 30°. ($a_{max}$ for a hemisphere $= (\frac{1}{2}r/2r)100 = 25$).

Having confirmed from test data that $\overline{\Delta p/\rho} = 0.075 \, a \, \overline{V_w^2}$, the derivation with regard to FIG. 2 for RMS power obtainable from the WT then follows:

$$\overline{P} = \overline{h} \, \dot{w} \, c_p$$
$$= \overline{h} \, A_v \, V_v \, \rho \, c_p$$
$$= \overline{h} \, A_v \, (2g\overline{h})^{\frac{1}{2}} \, \rho \, c_p$$

where
w = mass rate of air flow through the WT in lb/sec
$c_p$ = power coefficient of the WT, assumed to be 0.4 from "Wind Machines", by F. R. Eldridge, Mitre Corp., Publication No. MTR-6971, October 1975, p. 55.
$A_v$ = elliptical area facing the wind of the vent in which the WT is located (i.e., the vertical projection of the circular vent) (ft²)
$V_v$ = vertical air velocity in the vent (ft/sec)
g = gravitational acceleration = 32.2 ft/sec²

Then $$\overline{P} = 0.0023(8.02) \, A_v \, \overline{h}^{1.5} \, (0.4) \text{ (ft lb/sec)}$$
$$= 0.0184 \, A_v \, \overline{h}^{1.5} \, (0.4)(0.746/550) \text{ (KW)}$$
$$= 0.0000100 \, A_v \, \overline{h}^{1.5}$$
$$= 0.0000100 \, \pi R_{WT}^2 \sin \alpha \, (\overline{\Delta p}/\rho)^{1.5}$$
$$= 0.000031 \, R_{WT}^2 \sin \alpha \, (0.075 \, a \, \overline{V_w^2})^{1.5}$$
$$= 0.000000637 \, R_{WT}^2 \sin \alpha \, (a \, \overline{V_w^2})^{1.5} \text{ (KW)}$$

To obtain estimates for plant cost per unit of power produced, the volume of hydrogen required to lift the TAWECS components must first be found from the equation $$\text{Lift} - W_T = \epsilon$$

where

Lift = (density$_{air}$ − density$_{H2}$) Volume$_{H2}$

= (0.08071 − 0.00561) Vol$_{H2}$ = 0.0751 Vol$_{GB}$ for the case in which Vol$_{H2}$ = Vol$_{GB}$ Then Lift = 0.0751 ($\frac{4}{3}\pi R_{GB}^3 - \pi(1.1\ R_{WT})^2\ R_{GB}$)

= 0.0751 $\pi R_{GB}$ ($\frac{4}{3} R_{GB}^2 - 1.21 R_{WT}^2$)

Figure 4B:
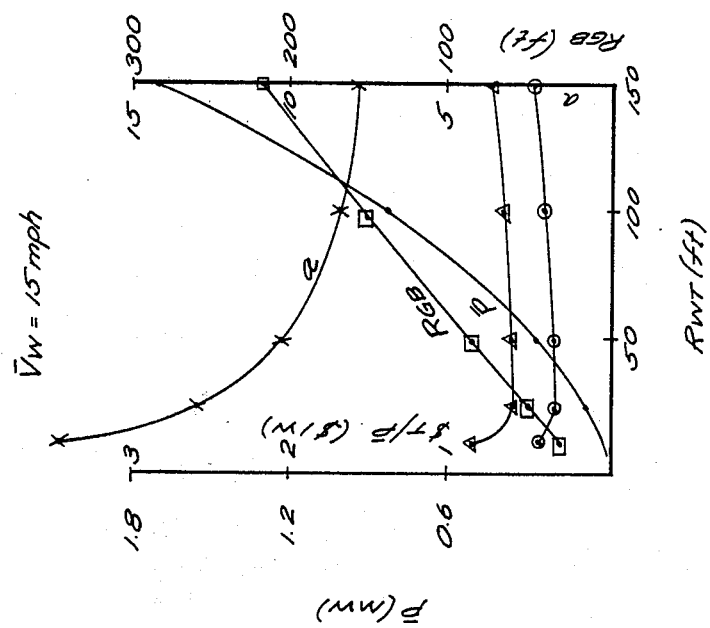
FIGS. 4a and 4b are plots of predicted performance data for the TAWECS of FIG. 2 at two different average wind velocities.
Figure 4A:
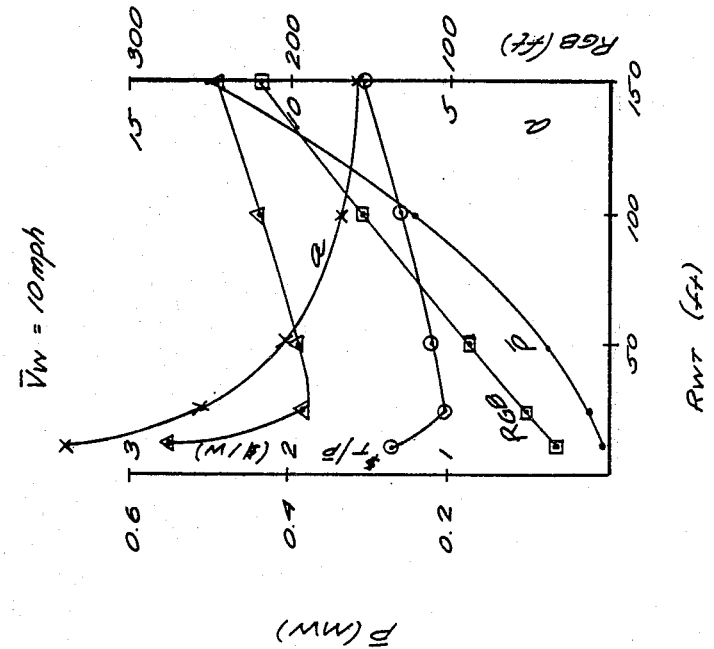

W$_T$ = total weight of the components lifted by the gas bag $\epsilon$ = an arbitrary moderate lift, found by successive approximation by varying R$_{GB}$, to ensure moderate tension on the tethers. An $\epsilon \approx 10\ R_{WT}$ was used in the following calculations. For each successive approximation of R$_{GB}$, an approximate value of a is first assumed, $\epsilon$ is calculated and a revised value of a is found from $a = (\frac{1}{2}(R_{GB} - R_{WT})/2R_{GB})100 = 25(1 - R_{WT}/R_{GB})$ Then $\epsilon$ is recalculated using this revised value of a and this process is iterated until $\epsilon$ meets the above criterion. Then the component costs are estimated and summed, and the sum $T is divided by $\bar{P}$. Let $W_T = W_{GB} + W_{WT} + W_{GEN} + W_{FRAME} + W_{TETHERS} + W_{LINE} + W_{FLAPs}$ and let d be the unit weight for each component to be lifted by the gas bag. Then $W_{GB} = \bar{d}_{GB}A_{GB} = \bar{d}_{GB}(2\pi R_{GB}^2 + \pi R_{GB}^2 - 2\pi(1.1R_{WT})^2 + 2\pi(1.1R_{WT})R_{GB})3$ where the factor 3 is included to account for the compartmentation of the gas bag necessary to prevent one puncture causing catastrophic damage. Then $W_{GB} = \bar{d}_{GB}(3\pi(R_{GB}(3\ R_{GB} + 2.2\ R_{WT}) - 2.42\ R_{WT}^2))$
Let $\bar{d}_{GB}$ = 0.1 lb/ft$^2$
$W_{WT} = \bar{d}_{WT}2R_{WT}$  Let $\bar{d}_{WT} = R_{WT}/4$ lb/ft
$W_{GEN} = \bar{d}_{GEN}\bar{P}$  Let $\bar{d}_{GEN}$ = 5 lb/KW
$W_{FRAME} = 3\ \bar{d}_{FRAME}R_{GB}$  Let $\bar{d}_{FRAME} = R_{WT}/2$ lb/ft
$W_{TETHERS} = 3\ a_1\ \bar{d}_{TETHERS}$  Let $a_1 = 3\ R_{WT}$
  Let $\bar{d}_{TETHERS} = R_{WT}/100$ lb/ft
$W_{LINE} = \bar{d}_{LINE}2R_{WT}$  Let $\bar{d}_{LINE} = R_{WT}/50$ lb/ft
$W_{FLAPS} = \bar{d}_{FLAPS}2\pi\ R_{GB}$  Let $\bar{d}_{FLAPS} = R_{WT}/10$ lb/ft
$W_T = 0.1\ A_{GB} + R_{WT}^2(0.5 + 0.09 + 0.04) + R_{WT}R_{GB}(1.5 + 0.2\pi) + 5\ \bar{P}$
= 0.1 $A_{GB}$ + 0.63 $R_{WT}^2$ + 2.128 $R_{WT}R_{GB}$ + 5 $\bar{P}$
Let $T = $GB + $WT + $GEN + $FRAME + $TETHERS + $LINE + $FLAPS + $TCS + $H2 + $H2GEN + $CRADLE and let C be the production model unit costs for each component of the TAWECS system, both those to be lifted by the gas bag, and the ground supported components. Then $$GB = $\bar{C}_{GB}A_{GB}$  Let $\bar{C}_{GB}$ = 0.2 and 0.5 $/ft$^2$
$$WT = 2\ \bar{C}_{WT}R_{WT}$  Let $\bar{C}_{WT} = R_{WT}$ $/ft
$$GEN = \bar{C}_{GEN}\bar{P}$  Let $\bar{C}_{GEN}$ = 50 $/KW
$$FRAME = 3\ \bar{C}_{FRAME}R_{GB}$  Let $\bar{C}_{FRAME} = R_{WT}/2$ $/ft
$$TETHERS = 3\ \bar{C}_{TETHERS}a_1$  Let $\bar{C}_{TETHERS} = R_{WT}/100$ $/ft -continued
$$LINE = \bar{C}_{LINE}(2R_{WT} + 4R_{WT})$  Let $\bar{C}_{LINE} = R_{WT}/25$ $/ft
$$FLAPS = \bar{C}_{FLAPS}2\pi R_{GB}$  Let $\bar{C}_{FLAPS} = R_{WT}/5$ $/ft
$$TCS = $_{Control\ System} + 3\ \bar{C}_{Winch\ and\ Motor}$ Let $$_{Control\ Sys}$ = $300; Let $\bar{C}_{Winch\ and\ Motor}$ = 4 $R_{WT}$ $/Winch and Motor $$H2 = \bar{C}_{H2}Vol_{GB}$  Let $\bar{C}_{H2}$ = 0.02 $/ft$^3$
$$H2GEN = \bar{C}_{H2GEN}R_{WT}^3$  Let $\bar{C}_{H2GEN}$ = 0.05 $/ft$^3$
$$CRADLE = 3R_{WT}^2$
$$T = \bar{C}_{GB}A_{GB} + 0.02\ Vol_{GB} + 0.05\ R_{WT}^3 + R_{WT}^2(2 + 0.09 + 0.24 + 3) + R_{WT}R_{GB}(1.5 + 0.4\pi) + 300 + |2\ R_{WT} + 0\ 50\ \bar{P}$
= $\bar{C}_{GB}A_{GB} + 0.02\ Vol_{GB} + 0.05\ R_{WT}^3 + 5.33\ R_{WT}^2 + 2.756\ R_{WT}R_{GB} + 300 + |2\ R_{WT} + 50\ \bar{P}$ Using these equations provides the data in FIGS. 4a and 4b, which indicate that this TAWECS configuration should produce power economically, but there may be little or no economic advantage to large values of R$_{WT}$. However, all the assumed values for component unit weights and costs are subject to revision, and the increase in $T/\bar{P}$ is probably due to too large an assumed unit cost (and/or unit weight) for at least one component. Even if the unit costs are too low by a factor of $\frac{1}{2} - 1/5$, $T/\bar{P}$ should be economic for either power grid or remote site applications when V$_w$ ≥ 15 mph.

Figure 5:
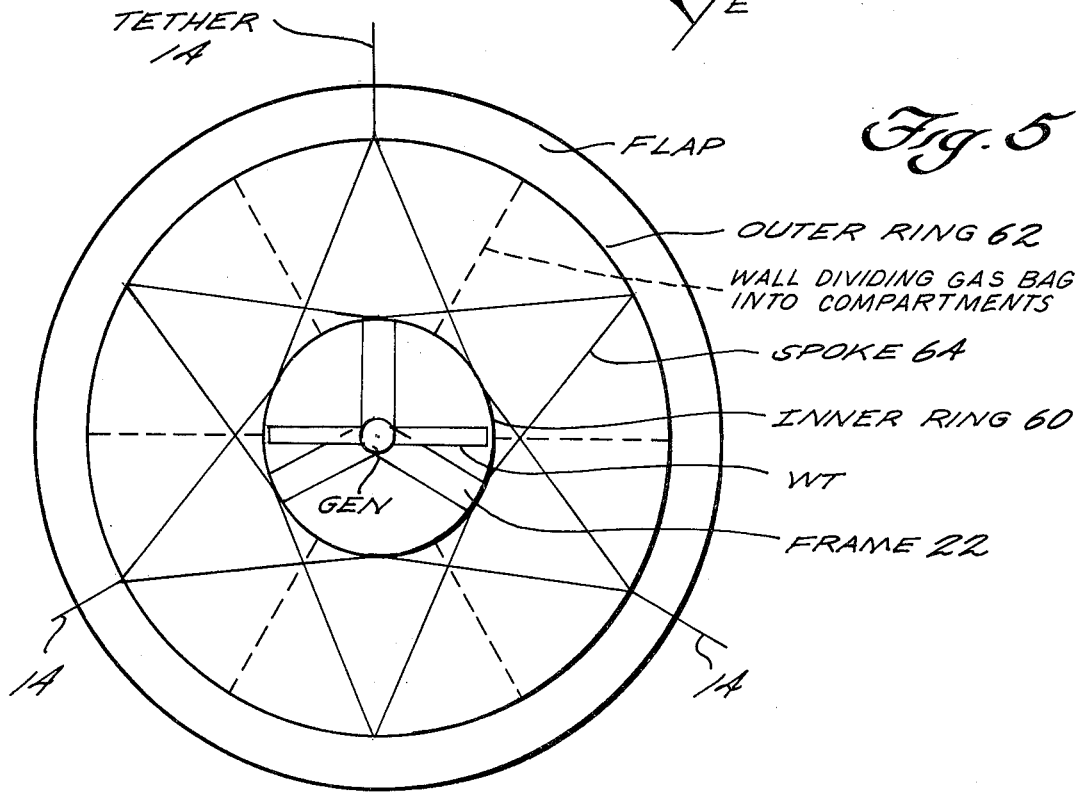
FIG. 5 is a top plan view of a modified gas bag base for the TAWECS, in effect a second embodiment thereof.

FIG. 5 relates to a second embodiment of the invention in which there is provided an alternative to the metal ring 46 of the embodiment of FIGS. 2–4. FIG. 5 shows the second embodiment in schematic top plan view of the level of the gas bag base. Two metal rings 60, 62 may be used, made of shaped steel or aluminum (e.g., tubular), with spokes 64 in tension between the rings to support the inner ring 60. The outer ring 62 supports the flaps 42, 44. The inner ring supports a three-arm frame 22' which supports the WT and GEN. The gas bag is connected to both rings to support the TAWECS components borne aloft. The gas bag should be constructed in sections of about 30° per section, or less, each section self-contained, to minimize damage and gas loss from one puncture. The section vertical sides and bottoms may be black plastic or fabric, with transparent hemispherical section tops, to warm the hydrogen inside by solar radiation and greenhouse effect, and increase lift by decreasing the density of the hydrogen. The gas bag sections connect at the top center to a circular member such as a tube (not shown) which supports the hydrogen release valve, the aircraft warning lights, if required, and the lightning rods. With these structural changes in the TAWECS, the previous calculations are modified as follows:

$W_{Outer\ Ring} = \bar{d}_{OR}2\pi R_{GB}$  Let $\bar{d}_{OR} = R_{WT}/3$ lb/ft
$W_{Inner\ Ring} = \bar{d}_{IR}2\pi(1.1R_{WT})$  Let $\bar{d}_{IR} = R_{WT}/6$ lb/ft
$W_{FRAME} = 3\ \bar{d}_{FRAME}(1.2R_{WT})$  Let $\bar{d}_{FRAME} = R_{WT}/2$ lb/ft
$W_{Spokes} = 2(6)\ \bar{d}_{Spokes}(1.1R_{GB})$  Let $\bar{d}_{Spokes} = R_{WT}/50$ lb/ft
$W_{GB} = \bar{d}_{GB}A_{GB}$  Let $\bar{d}_{GB}$ = 0.1 lb/ft$^2$
where $A_{GB} = \pi(R_{GB}(3R_{GB} + 2.2R_{WT}) - 2.42R_{WT}^2) + 2\ (12)\ (\pi R_{GB}^2/4 - R_{GB}(1.1R_{WT}))$
= $\pi(R_{GB}(9R_{GB} + 2.2R_{WT}) - 2.42R_{WT}^2) - 24.6\ R_{GB}R_{WT}$
= $\pi(R_{GB}(9R_{GB} - 6.19R_{WT}) - 2.42R_{WT}^2)$ Then $W_T = W_{GB} + W_{OR} + W_{FLAPS} + W_{IR} + W_{Spokes} + W_{FRAME} + W_{WT} + W_{GEN} + W_{TETHERS} + W_{LINE}$ $$W_T = 0.1\, A_{GB} + R_{WT}^2(1.1/3\, \pi + 1.8 + 0.5 + 0.09 + 0.04) + R_{WT} R_{GB}(\tfrac{2}{3}\pi + 0.2\pi + 13.2/50) + 5\, \overline{P}$$
$$= 0.1\, A_{GB} + 3.58\, R_{WT}^2 + 2.99\, R_{WT} R_{GB} + 5\, \overline{P}$$

$\$_{OR} = \overline{C}_{OR}\, 2\pi\, R_{GB}$  Let $\overline{C}_{OR} = R_{WT}/3$ \$/ft
$\$_{IR} = \overline{C}_{IR}\, 2\pi(1.1\, R_{WT})$  Let $\overline{C}_{IR} = R_{WT}/6$ \$/ft
$\$_{Frame} = 3\, \overline{C}_{Frame}(1.2\, R_{WT})$  Let $\overline{C}_{Frame} = R_{WT}/2$ \$/ft
$\$_{Spokes} = 12\, \overline{C}_{Spokes}(1.1\, R_{GB})$  Let $\overline{C}_{Spokes} = R_{WT}/50$ \$/ft
$\$_{GB} = \overline{C}_{GB} A_{GB}$  Let $\overline{C}_{GB} = 0.2$ and $0.5$ \$/ft$^2$
$\$_{Cradle} = 6\, \overline{C}_{Cradle}$  Let $\overline{C}_{Cradle} = R_{WT}/2$ \$/Cradle Then $\$_T = \$_{GB} + \$_{OR} + \$_{Flaps} + \$_{IR} + \$_{Spokes} + \$_{Frame} + \$_{WT} + \$_{GEN} + \$_{Tethers} + \$_{Line} + \$_{TCS} + \$_{H_2} + \$_{H_2\,Gen} + \$_{Cradle}$ $$= \overline{C}_{GB} A_{GB} + 0.02\, \mathrm{Vol}_{GB} + 0.05\, R_{WT}^3 + R_{WT}^2(1.1/3\,\pi + 1.8 + 2 + 0.09 + 0.24) + R_{WT} R_{GB}(\tfrac{2}{3}\pi + 0.2\pi + 13.2/50) + 50\,\overline{P} + 300 + R_{WT}(12 + 3)$$
$$= \overline{C}_{GB} A_{GB} + 0.02\, \mathrm{Vol}_{GB} + 0.05\, R_{WT}^3 + R_{WT}(5.28 R_{WT} + 2.99 R_{GB} + 15) + 300 + 50\,\overline{P}$$

Using these modified equations, significant decreases in $\$_T/\overline{P}$ are obtained when compared with FIG. 4 (approximately 23% for $\overline{V}_w = 10$ mph and 12% for $\overline{V}_w = 15$ mph).

For the TAWECS of FIGS. 2 and 5, with $R_{GB} = 3\, R_{WT}$ and a confined vortex generated and sustained, the volume of hydrogen necessary for $\epsilon = 10\, R_{WT}$ may be found by solving for it in Lift $- W_T = \epsilon$ Let $a = 20$, $\alpha = 30°$, and $\overline{P} =$ twice the power produced by a TAWECS without a confined vortex. Let air at a pressure slightly greater than ambient fill the volume of the gas bag not required by the hydrogen. Making these changes, $$\overline{P} = 0.001837\, R_{WT}^2 \overline{V}_w^3$$

$$A_{GB} = \pi(3\, R_{WT}(27\, R_{WT} - 6.19\, R_{WT}) - 2.42\, R_{WT}^2) = 60\pi R_{WT}^2$$

$$W_T = 0.1\, A_{GB} + 12.55\, R_{WT}^2 + 5\, \overline{P} = (10.37 + 12.55)\, R_{WT}^2 + 5\, \overline{P} = 22.92\, R_{WT}^2 + 5\, \overline{P}$$

Lift $= 0.0751$ Vol $H_2 = W_T + 10\, R_{WT}$

Vol $H_2 = 13.32(22.92\, R_{WT}^2 + 5\, \overline{P} + 10\, R_{WT})$ $$\$_T = \overline{C}_{GB} A_{GB} + 0.02\, \mathrm{Vol}\, H_2 + 0.05\, R_{WT}^3 + R_{WT}(14.25\, R_{WT} + 15) + 300 + 50\,\overline{P}$$

Using these equations, the data obtained show a decrease in $\$_T/\overline{P}$ when compared with the TAWECS of FIGS. 2 and 5 of approximately 22% for $\overline{V}_w = 10$ mph and 7% for $\overline{V}_w = 15$ mph. Whether or not this case is in fact more economic than that of the first embodiment will be determined by the strength of the vortex (if any) that is generated and sustained, which can only be determined by further experiment.

In FIG. 2, the TAWECS is shown disposed over a flat terrain surface. It should be apparent that a hilltop site is included in the purview of the invention, even preferred, since wind velocity is generally greater at such sites.

The TAWECS could be assembled on a relatively flat terrain surface, inflated, and then moved to a relatively inaccessible site for installation, such as a hilltop, marsh, or over water by using one helicopter per tether.

To decrease the weight and cost of the generator connected to the wind turbine, a synchro generator could be used, connected electrically to a synchro motor on the ground at some convenient distance away, which is then connected to the load (electrical or mechanical).

It should now be apparent that the present invention provides a tethered airfoil wind energy conversion system preferably incorporating the following features and advantages:

A flexible gas bag support which:

a. Provides a maximum ratio of camber/chord, which produces a maximum pressure drop across the vent containing the wind turbine, thus maximizing the power produced by the wind turbine b. Provides a means of eliminating ice and snow buildup c. Allows wind turbines probably limited in size only by the wind turbine vanes d. May provide in one configuration a confined vortex above the wind turbine to further increase the pressure drop across the wind turbine; and A tether control system to keep the hemispheric gas bag airfoil oriented into the wind from any direction at an optimum angle of attack to maximize power output.

There are many forms of airfoils for aircraft applications employing reduced pressure on the suction side and increased pressure on the pressure side (as described in any aerodynamics text). A variety of gas bag shapes employing these basic principles may be used for wind turbine applications in place of the hemispherical form shown.

It should now be apparent that the tethered airfoil wind energy conversion system, as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A tethered airfoil wind energy conversion system, comprising:
   a positive-lift, lighter-than-air, flexible gas bag-type airfoil provided with a lined vent which extends completely generally axially therethrough;
   a wind turbine having a power output-providing device;
   frame means supported by said airfoil and mounting said wind turbine for rotation relative to said airfoil in axial alignment with said vent;
   a plurality of motorized, individually operable winches, being at least three in number, and being for disposition at spaced sites generally in an imaginary ring on the ground;
   each such winch having a tether line wound thereon and having a respective outer end;
   means connecting each tether line outer end to said airfoil radially distally of said vent, so that said airfoil is tethered to said winches from a plurality of widely distributed sites;

a means for supplying inflating lighter-than-air gas to the airfoil, this means including a gas inlet control valve;

a means for releasing inflating lighter-than-air gas from within the airfoil, this means including a gas release control valve;

means for sensing wind direction incident upon said airfoil and for providing an output signal in relation thereto;

a tether control system incorporating means for determining for each of a plurality of various different wind direction-related output signals received from said sensing means, respective control signals equating to the amounts by which each of the respective tether lines must be reeled in or played out in order to tilt the airfoil into the wind at an optimum angle of attack to maximize power output of said power output-providing device of said wind turbine;

means operatively connecting said sensing means to said tether control system for furnishing said output signal to said tether control system; and means operatively connecting said tether control system to each of said motorized, independently operable winches for furnishing said respective control signals to the respective said winches.

2. The tethered airfoil wind energy conversion system of claim 1, wherein:

the airfoil is of generally hemispherical shape, base generally downwards, with said wind turbine being mounted generally at the lower end of said vent.

3. The tethered airfoil wind energy conversion system of claim 2, further including flap means skirting said airfoil at the base thereof.

4. The tethered airfoil wind energy conversion system of claim 2, wherein:

said airfoil being internally divided into a plurality of individual compartments by internal wall means, in order to prevent one puncture from causing catastrophic loss of inflating gas from said airfoil.

5. The tethered airfoil wind energy conversion system of claim 4, wherein:

said internal wall means comprise a plurality of internal walls of flexible sheet extending perpendicularly to said base and radially of said vent at about 30° intervals.

6. The tethered airfoil wind energy conversion system of claim 5, wherein:

said base and said internal walls are relatively dark-colored and, and wherein the remainder of said airfoil is relatively transparent for enhancing warming by solar radiation of inflating gas contained in said airfoil.

7. The tethered airfoil wind energy conversion system of claim 1, wherein:

said tether control system operates in use to tilt said airfoil at an angle α of up to about 30° from horizontal, headed into the wind.

8. The tethered airfoil wind energy conversion system of claim 1, wherein:

said lined vent is superficially provided with ridge means spiraling thereabout along the length thereof for creating a vortex of the wind passing therethrough.

9. The tethered airfoil wind energy conversion system of claim 1, wherein:

said means for supplying inflating lighter-than-air gas to the airfoil includes a gas generator.

10. The tethered airfoil wind energy conversion system of claim 9, wherein said gas generator is a hydrogen generator.

11. The tethered airfoil wind energy conversion system of claim 10, wherein:

said hydrogen generator is borne aloft by said airfoil.

12. The tethered airfoil wind energy conversion system of claim 10, wherein:

said hydrogen generator constitutes at least part of said power output-providing device by having a capacity, when in use, to provide substantially more hydrogen, as an output product, than is required for providing inflating gas for said airfoil; and means for taking-off excess hydrogen from said hydrogen generator as an output product.

13. The tethered airfoil wind energy conversion system of claim 1, further including:

means communicated to said tether lines, said tether control system, and said control valves, for sensing the tension on said tether lines and for admitting inflating gas to said airfoil and for releasing inflating gas from said airfoil for maintaining said tension within a preselected range.

14. The tethered airfoil wind energy conversion system of claim 1, wherein:

said power output-providing device comprises rotary-driven electrical generator operatively coupled to said wind turbine.

15. The tethered airfoil wind energy conversion system of claim 14, wherein:

said electrical generator is supported aloft by said airfoil.

16. The tethered airfoil wind energy conversion system of claim 15, further comprising:

a service line connected with said electrical generator and extending therefrom for taking-off electrical power generated by operation of said electrical generator.

17. The tethered airfoil wind energy conversion system of claim 16, wherein:

said service line extends to the ground along one of said tether lines.

18. The tethered airfoil wind energy conversion system of claim 12, further comprising:

means for transmitting electrical power generated by opertion of said electrical generator to remotely of said electrical generator.

19. The tethered airfoil wind energy conversion system of claim 18, wherein:

said transmitting means is constituted by a microwave transmitter supported by said airfoil and a microwave receiver located on the ground.

20. The tethered airfoil wind energy conversion system of claim 1, wherein:

said power output-providing device comprises a rotary shaft.

21. The tethered airfoil wind energy conversion system of claim 20, wherein:

said rotary shaft is flexible.

22. The tethered airfoil wind energy conversion system of claim 1, wherein:

said frame means comprises three arms and a ring, of which the three arms extend from the wind turbine generally radially outwards to said ring and said ring extends about the outer periphery of the airfoil.

23. The tethered airfoil wind energy conversion system of claim 1, wherein:
said frame means comprises three arms extending from said wind turbine to the base of said lined vent, a ring having said three arms joined thereto at the base of said lined vent; an outer ring extending around the outer periphery of the airfoil; and a plurality of tensioned mechanical tie means interconnecting the inner and outer rings at a plurality of angularly spaced points.

24. The tethered airfoil wind energy conversion system of claim 1, further comprising:
a cradle disposed on the ground beneath said airfoil; and
means for guidingly lowering said airfoil down onto said cradle to a non-use position thereon.

25. A tethered airfoil wind energy conversion system, comprising:
a wind turbine having a power output-providing device for providing a power output as the wind turbine is rotated by the wind;
a generally toric, lighter-than-air gas-filled airfoil having a generally hemispherical outer, upper side and a generally flat inner, lower side, with a generally central, lined vent passageway communicating generally axially between said sides so as to have an entrance through said lower side and an exit through said upper side;
means coaxially mounting said wind turbine relative to said vent adjacent said vent entrance;
a plurality comprising at least three angularly widely distributed tether lines each attached to said airfoil distally of the longitudinal axis thereof;
a plurality of ground-based tether line payout/takeup devices, each having a respective said tether line connected therewith, so that the individual said devices may be operated to increase and decrease the lengths of the individual tether lines effectively in use, for directing the tethered airfoil and the wind turbine supported thereby into the wind both azimuthally and vertically without need for rotating the airfoil.

26. A tethered airfoil wind energy conversion system comprising:
a wind turbine having a power output shaft means;
frame means mounting the wind turbine for rotation about a generally vertical, but tiltable axis;
a buoyant-in-air gas bag means havig said frame means mounted thereto for deploying the resulting wind turbine, frame means, gas bag means assembly above a datum surface;
a plurality comprising at least three angularly widely distributed tether lines each having an upper end secured to said assembly and a lower end extended down to adjacency with said datum surface;
a separate means anchoring each said tether line lower end relative to said datum surface and including means for acting upon the respective tether line for effectively lengthening and shortening the distance between each respective tether line upper end and said datum surface;
control means connected to all of said effectively lengthening and shortening means and being operable to coordinately modify said distances by shortening at least one and/or lengthening at least another for selectively tilting said axis and thus both azimuthally and vertically directing the wind turbine into the wind.

27. A method for deploying a wind turbine into the wind, comprising:
suspending the wind turbine in mid-air above a datum surface by buoying the wind turbine with a lighter-than-air gas bag so that the wind turbine longitudinal axis is generally vertically oriented;
tethering the wind turbine down to the datum surface using a plurality of perimetrically widely distributed tether lines; and
coordinately relatively lengthening and shortening said tether lines in order to incline the wind turbine longitudinal axis in the azimuthal direction and to the degree which maximizes wind energy conversion by said wind turbine to rotary output power.

28. A wind energy conversion device tethered airfoil wind energy conversion system, comprising:
a positive-lift, lighter-than-air, flexible gas bag-type airfoil provided with a lined vent which extends completely therethrough;
a wind energy conversion device comprising a means for accepting a wind energy mechanical input and providing a converted power output;
means mounting said wind energy conversion device on said airfoil for movement of portions thereof with respect thereto incident to accepting said input and providing said converted output, said wind energy conversion device being disposed athwart said vent, so that at least some wind in order to transit said vent must impact said wind energy conversion device;
a plurality of tether lines, being at least three in number, each having a first end effectively secured to the airfoil and a depending second end;
a respective anchor means associated with said second end of each tether line;
each tether line and respective anchor means associated there with including means for effectively adjusting the length in use of the respective tether line for correspondingly adjusting the vector of tilting of said airfoil and thus adjusting the aiming of said vent, for regulating the acceptance of wind energy by said wind energy conversion device.

29. The wind energy conversion device tethered airfoil wind energy conversion system of claim 28 wherein:
said wind energy conversion device comprises a wind turbine and frame means mounting that wind turbine on the airfoil.

30. The wind energy conversion device tethered airfoil wind energy conversion system of claim 28 wherein:
said wind energy conversion device comprises an electrical generator for converting mechanical motion to electrical power.

31. The wind energy conversion device tethered airfoil wind energy conversion system of claim 28 wherein:
said system further includes means for communicating said converted power output to a ground site off-board said airfoil.

32. Apparatus for supporting aloft a wind-operated means, comprising:
a positive-lift, lighter-than-air, flexible, gas bag-type airfoil provided with a lined vent which extends completely therethrough;

a wind-operated means comprising means for accepting a wind input and causing an effect of said wind input to be manifested by said wind-operated means;

means mounting said wind-operated means on said airfoil effectively athwart said vent so that at least some wind in order to transit said vent must effectively encounter said wind-operated means, and experience said effect caused thereby;

a plurality of tether lines, being at least three in number, each having a first end effectively secured to the airfoil and a depending second end;

a respective anchor means associated with said second end of each tether line;

each tether line and respective anchor means associated there with including means for effectively adjusting the length in use of the respective tether line for correspondingly adjusting the vector of tilting of said airfoil and thus adjusting the aiming of said vent, for regulating the acceptance of wind energy by said wind energy conversion device.

33. A method for deploying a wind-operated means into the wind, comprising:

suspending the wind-operated means in mid-air above a datum surface by buoying the wind-operated means above a datum surface with a lighter-than-air gas bag so that the wind-operated means is accessible along a generally vertical path;

tethering the wind-operated means down to the datum surface using a plurality of perimetrically widely distributed tether lines; and coordinately relatively lengthening and shortening said tether lines in order to incline said path of accessibility in the azimuthal direction and to the degree which maximizes per unit time operating effect of the wind on said wind-operated means.

* * * * *

UNITED STATES PATENT AND TRADEMARK OFFICE
CERTIFICATE OF CORRECTION

PATENT NO. : 4,309,006
DATED : January 5, 1982
INVENTOR(S) : Lloyd I. Biscomb

It is certified that error appears in the above—identified patent and that said Letters Patent is hereby corrected as shown below:

Col. 12, line 48, change "12" to --15--.

Signed and Sealed this

First Day of June 1982

[SEAL]

Attest:

GERALD J. MOSSINGHOFF

Attesting Officer

Commissioner of Patents and Trademarks